(12) United States Patent
Frank et al.

(10) Patent No.: US 8,049,663 B2
(45) Date of Patent: Nov. 1, 2011

(54) HARDWARE COMPENSATING PULSE COMPRESSION FILTER SYSTEM AND METHOD

(75) Inventors: Mark S. Frank, Beaverton, OR (US); Marty K. Rupp, Tucson, AZ (US); Devin B. Pratt, Vail, AZ (US)

(73) Assignee: Raytheon Company, Waltham, MA (US)

( * ) Notice: Subject to any disclaimer, the term of this patent is extended or adjusted under 35 U.S.C. 154(b) by 366 days.

(21) Appl. No.: 12/370,022

(22) Filed: Feb. 12, 2009

(65) Prior Publication Data
US 2009/0289836 A1     Nov. 26, 2009

Related U.S. Application Data

(60) Provisional application No. 61/055,123, filed on May 21, 2008.

(51) Int. Cl.
*G01S 7/40*     (2006.01)
(52) U.S. Cl. ........ 342/189; 342/159; 342/173; 342/174; 342/194; 455/63.1

(58) Field of Classification Search .................. 342/189, 342/159, 173, 174, 194, 62; 455/63.1
See application file for complete search history.

(56) References Cited

U.S. PATENT DOCUMENTS

| 7,924,218 B2 * | 4/2011 | Siegel ............................. 342/159 |
| 7,933,555 B2 * | 4/2011 | Moloudi ....................... 455/63.1 |
| 7,945,210 B2 * | 5/2011 | Aue .............................. 455/63.1 |
| 2009/0289836 A1 * | 11/2009 | Frank et al. ................... 342/189 |

* cited by examiner

*Primary Examiner* — John Sotomayor
(74) *Attorney, Agent, or Firm* — SoCal IP Law Group LLP; John E. Gunther; Steven C. Sereboff

(57) ABSTRACT

A method to improve a system's signal performance may comprise: generating a first signal, transmitting the first signal, receiving the first signal, and generating a second signal. The method may further comprise: identifying signal distortions generated by at least one of, a transmitter hardware that transmits the first signal and a receiver hardware that receives the first signal, modifying the second signal based upon the identified signal distortions, correlating the first signal and the second signal by a correlator to generate a correlated signal, and outputting the correlated signal.

50 Claims, 3 Drawing Sheets

HARDWARE COMPENSATING PULSE COMPRESSION FILTER SYSTEM AND METHOD

CROSS-REFERENCES TO RELATED APPLICATIONS

This application claims the benefit of U.S. Provisional Patent Application No. 61/055,123 filed May 21, 2008, and incorporates the disclosure of that application by reference.

FIELD OF INVENTION

A hardware compensating pulse compression filter system and method is generally directly towards a system and method to improve a signal's resolution. More particularly, embodiments of a hardware compensating pulse compression filter system and method generally relate to systems, devices, and methods for reducing the effects of radar signal degradation caused by the system's hardware.

BACKGROUND OF INVENTION

A pulsed Doppler radar system that may be used to determine a detected object's range relies upon a signal, such as a compressed waveform. The signal is transmitted and received back by the radar system; i.e. the compressed waveform echoes back from contact with the detected object. The received signal is then correlated against a reference waveform, where the reference waveform is substantially identical to (or sometimes the complex conjugate of) the transmitted waveform. Hardware that is part of the radar's transmission and receiving components can degrade the transmitted and/or received (echoed) signal. This degradation may manifest itself in terms of increased integrated or peak range side lobe levels and other amplitude and phase distortions. The degradation further results in difficulty by the system to correlate the transmitted/received signal to the reference waveform.

To compensate for this problem, radar hardware generally had to be very carefully designed and manufactured to remove the inherent hardware impairments, which is very costly to design and manufacture. Accordingly, improved signal resolution may be attained if the reference waveform were modified based upon the known and/or identifiable hardware errors that degrade the transmitted/received signal.

SUMMARY OF THE INVENTION

In accordance with exemplary embodiments, a hardware compensating pulse compression filter system and method provides a system and method for improving resolution of a signal. Advantages of the hardware compensating pulse compression filter system and method will be set forth in the Detailed Description which follows and may be apparent from the Detailed Description, or the advantages may be learned by practice of embodiments of the hardware compensating pulse compression filter system and method. Still other advantages of the hardware compensating pulse compression filter system and method may be realized by any of the systems, methods, or combinations of systems and methods particularly pointed out in the claims.

BRIEF DESCRIPTION OF THE DRAWINGS

Representative elements, operational features, applications and/or advantages of a hardware compensating pulse compression filter system and method reside in the details of construction and operation as more fully hereafter depicted, described and claimed with reference being made to the accompanying drawings forming a part hereof, wherein like numerals refer to like parts throughout. Other elements, operational features, applications and/or advantages will become apparent in light of certain embodiments recited in the detailed description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the hardware compensating pulse compression filter system and method.

The terms "first", "second", and the like herein, if any, are used for distinguishing between similar elements and not necessarily for describing a sequential or chronological order. Moreover, the terms "front", "back", "top", "bottom", "over", "under", "forward", "aft", and the like in the description and/or in the claims, if any, are generally employed for descriptive purposes and not necessarily for comprehensively describing exclusive relative position. Any of the preceding terms so used may be interchanged under appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The descriptions contained are of exemplary embodiments of the invention and the inventor's conception of the best mode and are not intended to limit the scope, applicability or configuration of the invention in any way. Rather, the following description is intended to provide convenient illustrations for implementing various embodiments of the invention. Changes may be made in the function and/or arrangement of any of the elements described in the disclosed exemplary embodiments without departing from the spirit and scope of the invention.

Various representative implementations of the hardware compensating pulse compression filter system and method may be applied to any radar system. Certain representative implementations may include, for example: a hardware compensating pulse compression filter sized suitably for any pulse-coded system; made out of any suitable material and/or the like. The hardware compensating pulse compression filter system and method may provide an alternative to utilizing high precision hardware to reduce cost, or the system and method may be utilized in conjunction with high precision hardware to improve performance.

Figure 1:
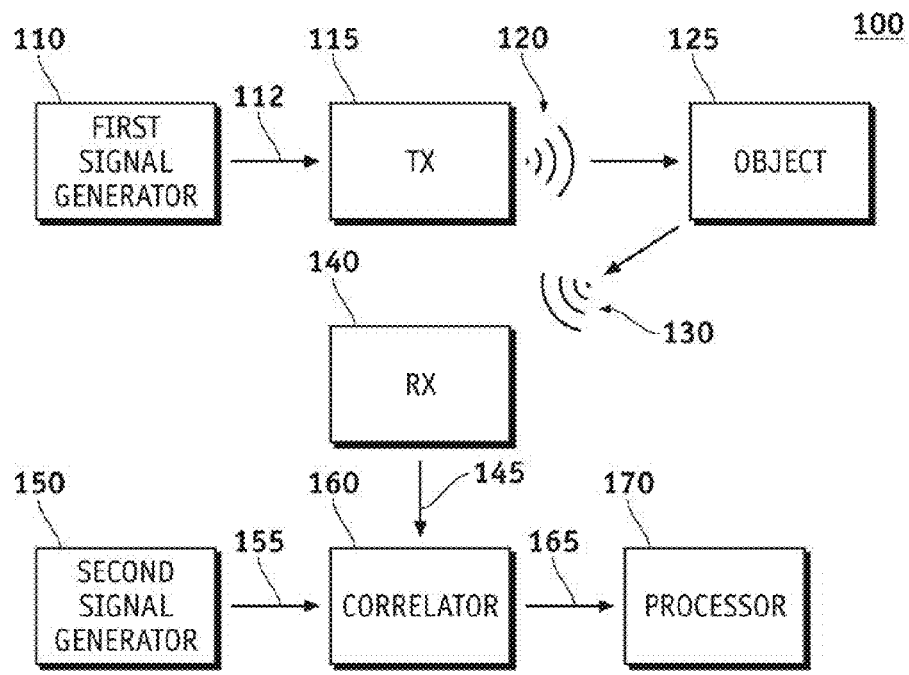
FIG. 1 representatively illustrates a block diagram of a hardware compensating pulse compression filter system, according to an embodiment of the present invention.

In accordance with an embodiment of the present invention, a hardware compensating pulse compression filter system may provide greater resolution for a radar system. The filter system may compensate for known hardware errors encountered by a transmitted signal, and may appropriately modify a reference signal such that the return transmitted signal (echo signal) can be more readily correlated to the reference signal. With reference to FIG. 1, an embodiment of a hardware compensating pulse compression filter system ("filter system") is representatively illustrated. In an aspect of the present invention, the filter system may comprise, in whole or in part, a radar system, such as a pulsed Doppler radar system and/or part of a missile seeking system. FIG. 1 representatively illustrates an embodiment of a filter system 100 that may comprise a first signal generator 110 that may generate a first signal 112, and a transmitter 115 to transmit the first signal 112, i.e. transmitted signal 120. Filter system 100 may comprise a receiver 140 to receive an echo signal 130. The echo signal 130 may comprise the transmitted signal 120 reflected off of an object 125, for example, an enemy target. Filter system 100 may further comprise a received signal 145, where the received signal 145 may comprise the echo signal 130 redirected by the receiver 140. System 100 may further comprise a second signal generator 150 to generate a second (reference) signal 155. Reference signal 155 may be used to correlate received signal 145 to reference signal 155 by a correlator 160, and the correlator 160 may subsequently generate a correlated signal 165. In accordance with an aspect of the present invention, correlator 160 may comprise a pulse compression filter, and the pulse compression filter may comprise a mismatch filter design.

In accordance with an embodiment of the present invention, the correlator 160 may correlate the received signal 145 to the reference signal 155, but may also modify the reference signal 155 to compensate for hardware errors that: the first signal 112, the transmitted signal 120, the echo signal 130 and/or the received signal 145 may encounter. By compensating for hardware errors, the reference signal 155 may better correlate to the received signal 145 to provide greater resolution of the correlated signal 165, i.e. result in less noise, more so than if reference signal 155 were not modified. Filter system 100 may also comprise additional components to manipulate the correlated signal 165, such as: a processor 170 to further process the correlated signal 165, a display (not shown) to display the transmitted correlated signal 165, and/or an analog-to-digital converter (not shown). In an aspect of the present invention, the analog-to-digital converter may be incorporated within the receiver 140 or as a standalone device, and any suitable electronic device that converts an analog signal to a digital number may be implemented. Similarly, the processor 170 and/or the display may be incorporated within various components of the filter system 100, or may be incorporated as standalone devices. Moreover, in an embodiment, the first signal generator 110 and the transmitter 115 may continuously send out signals, and the filter system 100 may repeatedly operate as discussed for each dispatched and received signal.

In accordance with an embodiment of the present invention, and with reference to FIG. 1, the filter system 100 may comprise the first signal generator 110 and the second signal generator 150. The first signal generator 110 and the second signal generator 150 may comprise any type of signal generation system. For example, signal generators 110 and 150 may comprise a transmit drive signal and/or a receiver coherent local oscillator, respectively, generated by the radar's frequency reference unit or exciter. The first signal generator 110 may be similar to second signal generator 150, but in another embodiment first signal generator 110 may be different to second signal generator 150. Moreover, system 100 may comprise any number or combinations of signal generators.

In accordance with an embodiment of the present invention, and with reference to FIG. 1, the first signal generator 110 may generate the first signal 112 and the second signal generator 150 may generate the second (reference) signal 155. First signal generator 110 and second signal generator 150 may generate signals that comprise a particular waveform, and/or waveforms that have been modulated, encoded, and the like. The signals 112 and 155 generated by either one or both of the generators 110 and 150 may comprise waveforms for a radar system. In this embodiment, the generated waveforms may comprise a pulsed coded wave function that may be used to maximize the sensitivity and resolution of the radar system, and the generated waveforms may further comprise: binary phase coding, poly-phase coding, frequency modulation, frequency stepping, and the like waveforms. Moreover, either one or both of the signals 112 and 155 may comprise any length and form of, discretely coded phase modulation, discretely coded frequency modulation, linear or non-linear frequency or phase modulation, and using any potential signal modulation bandwidth. In an embodiment, generated first signal 112 and generated second signal 155 may comprise substantially identical waveforms, but in another embodiment generated reference signal 155 may comprise substantially a complex conjugate waveform of the generated first signal 112. Also, generated reference signal 155 may comprise substantially a mismatched waveform of the generated first signal 112

In accordance with an embodiment of the present invention, and with reference to FIG. 1, FIG. 1 representatively illustrates the transmitter 115 of the filter system 100 for transmitting the generated signal 112. In an aspect of the present invention, the transmitter 115 may comprise an antenna, but the transmitter 115 may also comprise any arrangement of aerial electrical conductors designed to transmit signals (radio waves). Generally, the transmitter 115 may be any arrangement of conductors that generate a radiating electromagnetic field in response to an applied alternating voltage and associated alternating electric current. The transmitter 115 may comprise directional or omni-directional antennas, and may also comprise an antenna array of multiple elements. Moreover, the transmitter 115 may comprise suitable values for: resonant frequency, impedance, gain, aperture or radiation pattern, polarization, efficiency, bandwidth, and the like. The transmitter 115 may also comprise any suitable maximum power rating, and any suitable noise rejection properties. In general, the transmitter 115 may comprise any components, electrical, mechanical, etc., that may contribute to transmit the signal 112. Also, elemental components may be modeled as individual components or housed together within the transmitter 115 body In accordance with an embodiment of the present invention and with reference to FIG. 1, the filter system 100 may comprise the receiver 140. The receiver 140 may comprise any of the various components described above for the transmitter 115, but may also comprise suitable elements or combinations of amplifiers, filters, mixers, oscillators, and the like to format the received signal 130, for example, to format the received signal 130 into a low frequency signal or a digital signal. Elemental components may be modeled as individual components or housed together within the receiver 140 body.

In accordance with an embodiment of the present invention, and with continued reference to FIG. 1, the filter system 100 may be part of an overall radar system to detect a discrete object, such as an object 125. The object 125 may be any form or entity that can reflect a signal, such as the signal 120, either fully, partially, coded, etc. The object 125 may comprise a manned or unmanned aircraft or airborne missile, a sea vessel, a land vehicle or other land-based object of interest including stationary aircraft, and the like, and the object 125 may be stationary, or moving.

In one aspect of the present invention, the object 125 may reflect the transmitted signal 120 when the transmitted signal 120 encounters the object 125. The transmitted signal 120 upon encountering the object 125 may be reflected back to the system 100 as the return (echo) signal 130. The return signal 130 may be received by the receiver 140, and then the return signal 130 may be further processed by other components, such as the correlator 160, the processor 170, and any other like components that may manipulate the return signal 130.

In accordance with an embodiment of the present invention and with reference to FIG. 1, the received signal 145 may be electronically routed to the correlator 160. The correlator 160 may compare the received signal 145 to the reference signal 155 that has been modified to account for hardware imperfections. As briefly described above, the correlator 160 may correlate the received signal 145 to the reference signal 155, but may also modify the reference signal 155 to compensate for hardware errors that: the first signal 112, the transmitted signal 120, the echo signal 130 and/or the received signal 145 may encounter. By compensating for hardware errors, the reference signal 155 may better correlate to the received signal 145 to provide greater resolution of a correlated signal 165, i.e. result in less noise, more so than if reference signal 155 were not modified. In an embodiment of this invention, the modification of reference signal 155 and the subsequent correlation to received signal 145 may both occur within the correlator 160.

Figure 2:
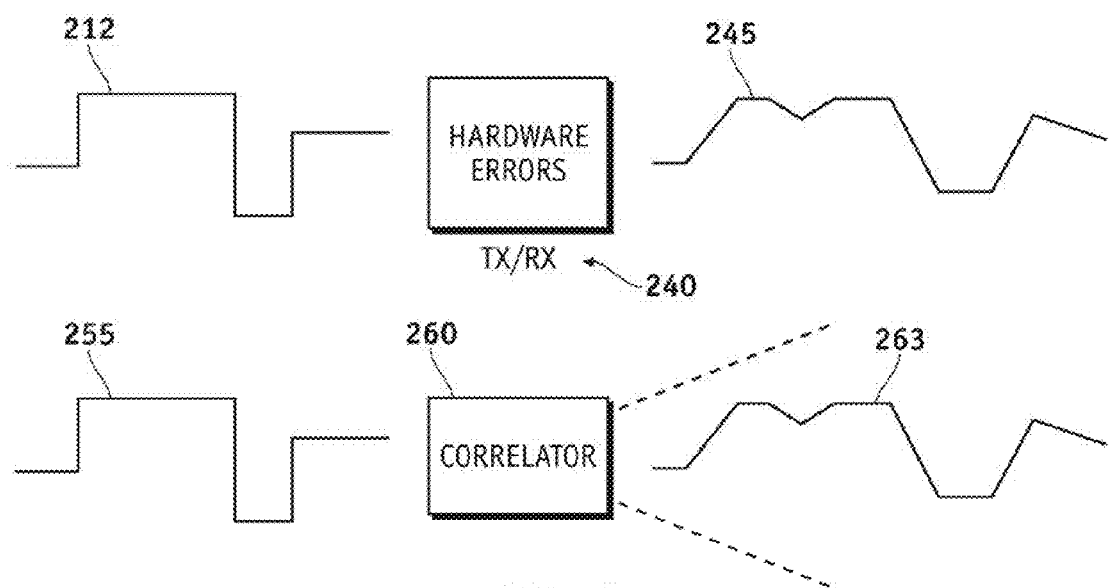
FIG. 2 representatively illustrates an aspect of the hardware compensating pulse compression filter system, according to the embodiment of the present invention.

In accordance with an embodiment of the present invention and with reference to FIG. 2, a first signal (ideal waveform) 212 comprising a particular waveform is shown. As the first signal 212 is: handled by the transmitter, such as the transmitter 115, echoes off of an object, such as the object 125, and/or routes through a receiver, such as the receiver 140, a signal 212 may degrade due to hardware errors into a different waveform, e.g. a degraded waveform 245. In an optimal environment, the first signal 212 does not degrade and a reference waveform, such as reference waveform 255, may be substantially similar to the first signal 212, such that correlation by a correlator, such as a correlator 260, can occur without excessive noise. To reduce noise levels, the reference waveform 255 may be modified, for example by amplitude and/or phase, based upon known hardware errors, so that the modified reference waveform 263 may correlate optimally with the degraded waveform 245.

Figure 3:
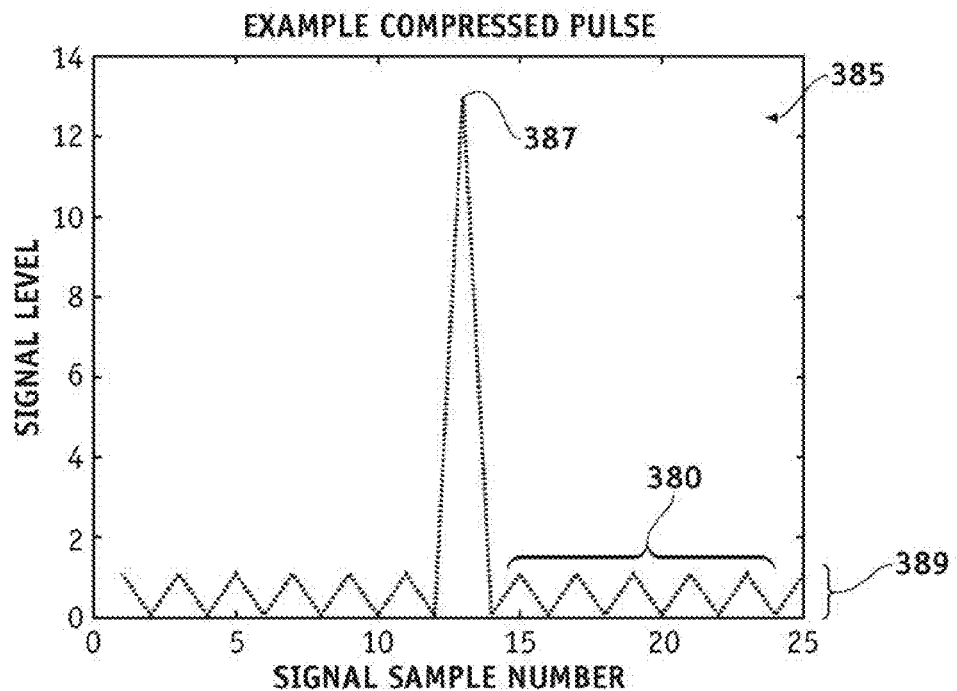
FIG. 3 graphically illustrates a pulse compression filter response, according to an embodiment of the present invention.

By anticipating known hardware errors, and modifying the reference waveform 255 to correlate optimally with the degraded waveform 245, the correlator 260 may assist by increasing the peak and suppressing the side lobes, thereby improving signal to noise ratio and peak to side lobe levels. In waveform pulse compression and with reference to FIG. 3, the peak 387 represents the target signal while the side lobes 380 are portions of a compressed pulse 385 that are not the main peak 387. The power 389 in the side lobes 380 is generally much less than that in the main peak 387. It is generally desirable to minimize the side lobe level, which is measured in decibels relative to the peak of the pulse compression response. A mismatched filter, which, when correlated with the received signal 145, yields cross-correlation output, such as correlated signal 165, with lower peak (or integrated) side lobes, without high signal to noise ratio loss. Mismatched filters can be optimized for any phase modulated codes. The mismatched filter may be any suitable type or length according to its corresponding reflected signal waveform.

To determine the modifications needed for reference waveform 255 to correlate with degraded waveform 245, a calibration may be conducted that may identify any hardware imperfections and distortions that degrade generated ideal waveform 212. From the identification of the hardware imperfections and distortions, the reference waveform 255 may be modified into modified reference waveform 263. The calibration may be conducted in real time (on-line) while the radar system 100 is in operation, or if the imperfections and distortions are predictable (simulated), the calibration may be conducted (off-line). In other embodiments, a combination of on-line and off-line calibrations may be conducted.

Figure 4A:
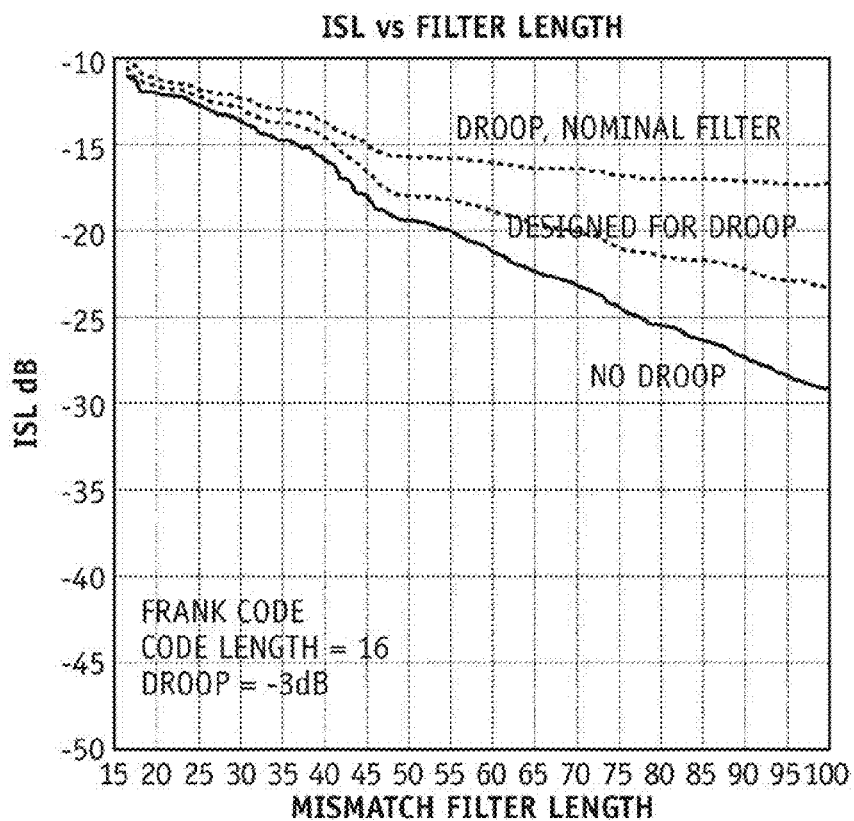
FIGS. 4A-4B graphically illustrates Pulse Droop and Phase Error of various filters, according an embodiment of the present invention.
Figure 4B:
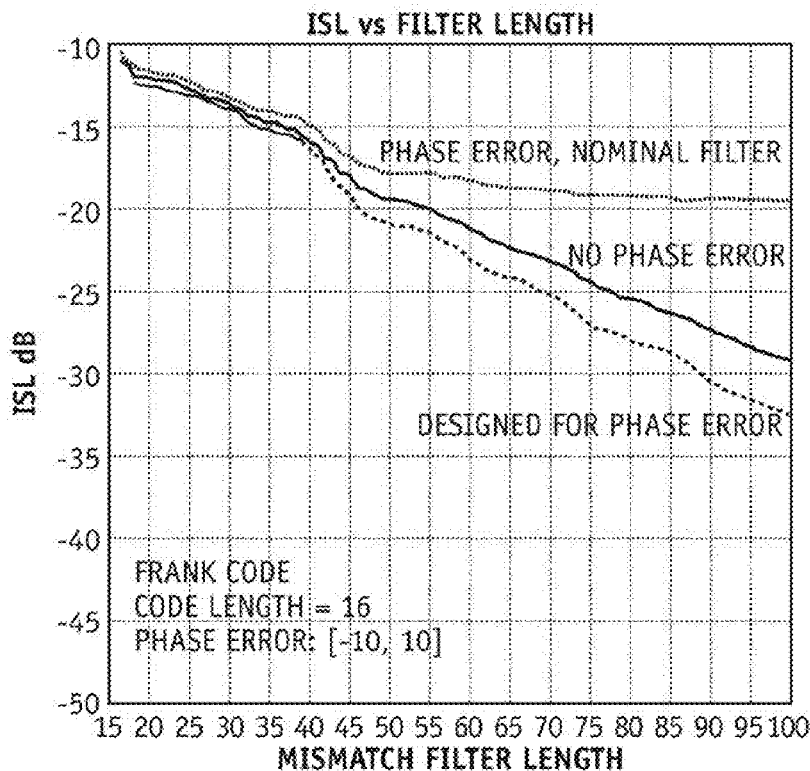

In accordance with an embodiment of the present invention, modified reference waveform 263 may be modified in any way to predict against potential performance threats that degrade ideal waveform 212 into degraded waveform 245. These performance threats may include but are not limited to: increased side lobe levels, decreased signal-to-noise ratio, and amplitude or phase distortion, and modified reference waveform 263 may approximate theses performance threats. In an aspect of the present invention, degraded waveform 245 may be continuously reviewed and updated for new hardware imperfections. With reference to FIGS. 4A-4B, FIGS. 4A-B graphically illustrates comparisons of Pulse Droop and Phase Error of various filters. The graphs illustrate examples of the performance improvement attainable by employing the present invention, i.e., the hardware compensating pulse compression filtering concept. The figures show integrated range sidelobe level (ISL) performance with pulse compression filters of varying lengths (the "Mismatched filter length"). FIG. 4A shows the effect of pulse amplitude error (pulse "droop"), while FIG. 4B shoes the effect of random phase error across the pulse. Both FIGS. 4A and 4B show performance for a 16 bit quad-phase Frank code.

FIG. 4A compares the ISL for: 1) perfect hardware with no errors (lowes of the three curves labeled "No droop"), 2) the ISL with pulse amplitude error that has been compensated by this invention (labeled "Filter designed for droop"), and 3) the ISL with no compensation for pulse droop. FIG. 4B compares the ISL for: 1) perfect hardware with no errors (lowest of the three curves labeled "No Phase Error"), 2) the ISL with phase error that has been compensated by this invention (labeled "Designed for phase error"), and 3) the ISL with no compensation for phase error. The figures show very significant performance improvements by employing hardware compensating pulse compression filtering in accordance with the present invention.

In accordance with an embodiment of the present invention and with reference to FIG. 1, the filtered results, such as correlated signal 165, may be sent to the signal processor 170. The signal processor 170 may use the filtered results along with a preprogrammed computer application to determine the desired attributes of the object 125. In one aspect of the present invention, the processor 170 may be implemented as a computer running target detection software. The filtered results may be displayed for review by a user and/or stored in a memory. In one aspect of the present invention, the signal processor 170 may comprise a cascade of hardware-based, firmware-based, and software-based processing to execute additional signal filtering and/or correlation of the correlated signal 165 prior to determining the desired attributes of object 125.

Figure 5:
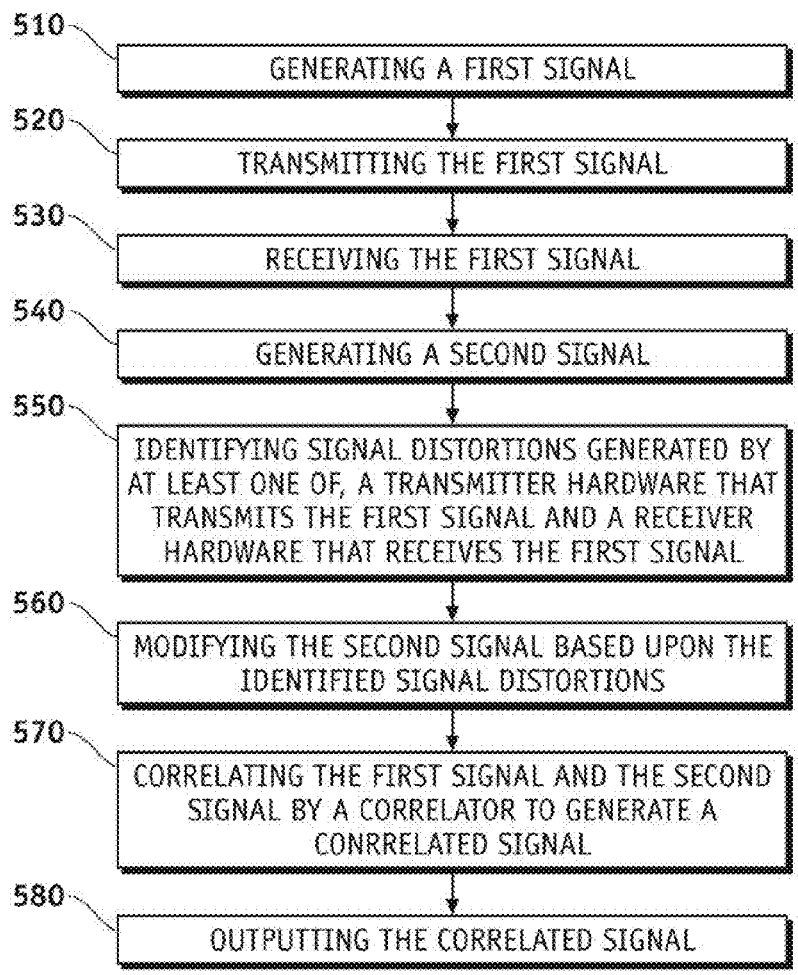
FIG. 5 representatively illustrates a flow chart of a method to improve a system's signal performance, according to an embodiment of the present invention.

In accordance with an embodiment of the present invention and with reference to FIG. 5, a method 500 to improve a system's signal performance may comprise: generating a first signal (510); transmitting the first signal (520); receiving the first signal (530); generating a second signal (540); identifying signal distortions generated by at least one of, a transmitter hardware that transmits the first signal and a receiver hardware that receives the first signal (550); modifying the second signal based upon the identified signal distortions (560); correlating the first signal and the second signal by a correlator to generate a correlated signal (570); and outputting the correlated signal (580).

In accordance with an embodiment of the present invention, generating a first signal (510) may be similar to the first signal generator 110 generating the first signal 112 (FIG. 1) and/or the first signal 212 (FIG. 2). Transmitting the first signal (520) may be similar to the transmitter 115 transmitting the first signal 112 as the transmitted signal 120. Receiving the first signal (530) may be similar to the receiver 140 receiving the signal 130 echoed off of the object 125. Generating a second signal (540) may be similar to the second signal generator 150 generating the second (reference) signal 155. Identifying signal distortions generated by at least one of, a transmitter hardware and a receiver hardware that receives the first signal (550), may comprise hardware from the transmitter 115 and/or the receiver 140. Modifying the second signal based upon the identified signal distortions (560), may comprise the second signal 155. Correlating the first signal and the second signal by a correlator to generate a correlated signal (570), may comprise the first signal to be similar to the received signal 145, the second signal to be similar to the second signal 155, the correlator to be similar to the correlator 160, and/or the correlated signal may be similar to the correlated signal 165. Outputting the correlated signal (580) may be similar to the correlated signal 165.

The invention is described with reference to specific embodiments, but various modifications and changes may be made without departing from the scope of the hardware compensating pulse compression filter system and method as set forth in the claims. The specification and figures are to be regarded in an illustrative manner, rather than a restrictive one and all such modifications are intended to be included within the scope of the hardware compensating pulse compression filter system and method. Accordingly, the scope of the invention should be determined by the claims and their legal equivalents. For example, unless otherwise specified or required by their nature, the steps recited in any method or process embodiments may be executed in any order and are not limited to the specific order presented in the claims. Additionally, the components and/or elements recited in any apparatus embodiment may be assembled or otherwise operationally configured in a variety of permutations to produce substantially the same result as the hardware compensating pulse compression filter system and method and are accordingly not limited to the specific configuration recited in the claims.

Benefits, other advantages and solutions to problems have been described above with regard to particular embodiments, but any benefit, advantage, solution to problems or any element that may cause any particular benefit, advantage or solution to occur or to become more pronounced are not to be construed as critical, required or essential features or components of any or all the claims.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the hardware compensating pulse compression filter system and method, in addition to those not specifically recited, may be varied or otherwise particularly adapted to specific environments, manufacturing specifications, design parameters or other operating requirements without departing from the general principles of the same.

What is claimed is:

1. A method to improve a system's signal performance comprises:
   generating a first signal;
   transmitting the first signal;
   receiving the first signal;
   generating a second signal;
   identifying signal distortions generated by at least one of, a transmitter hardware that transmits the first signal and a receiver hardware that receives the first signal;
   modifying the second signal based upon the identified signal distortions;
   correlating the first signal and the second signal by a correlator to generate a correlated signal; and
   outputting the correlated signal.

2. The method of claim 1, further comprising transmitting the correlated signal.

3. The method of claim 2, wherein transmitting the correlated signal further comprises transmitting the correlated signal to a processor.

4. The method of claim 3, wherein the processor comprises a display.

5. The method of claim 1, wherein the correlator comprises a pulse compression filter.

6. The method of claim 5, wherein the pulse compression filter comprises a mismatch filter design.

7. The method of claim 1, wherein the second signal is modified by the correlator.

8. The method of claim 1, wherein the modified second signal comprises one of at least an amplitude and a phase modification.

9. The method of claim 1, wherein the second signal comprises a reference waveform.

10. The method of claim 9, wherein:
    the first signal comprises a first waveform; and
    the modified reference waveform is substantially identical to the first waveform.

11. The method of claim 9, wherein:
    the first signal comprises a first waveform; and
    the modified reference waveform is substantially a complex conjugate of the first waveform.

12. The method of claim 9, wherein:
    the first signal comprises a first waveform; and
    the modified reference waveform is substantially a mismatched waveform configured to minimize range sidelobes.

13. The method of claim 1, wherein the system comprises a radar system.

14. The method of claim 1, wherein the system comprises a missile seeking system.

15. The method of claim 1, wherein at least one of the first signal and the second signal comprises a coded waveform.

16. The method of claim 15, wherein the coded waveform comprises at least one of a poly-phase code and a binary code.

17. The method of claim 1, wherein the system minimizes side lobes and increases signal to noise ratio of the correlated signal.

18. The method of claim 1, wherein the signal distortions generated by the at least one of the transmitter hardware and the receiver hardware are identified by calibration of the system.

19. The method of claim 18, wherein the calibration is conducted by one of at least an on-line calibration and an off-line calibration.

20. The method of claim 1, wherein the system comprises a pulsed Doppler radar system.

21. A system to improve signal performance comprising:
a first signal generator to generate a first signal;
a transmitter to transmit the first signal;
a receiver to receive the first signal;
a second signal generator to generate a second signal;
a signal modifier to modify the second signal based upon identifiable hardware errors from at least one of: a transmitter hardware that transmits the first signal and a receiver hardware that receives the first signal; and
a correlator to correlate the first signal and the second signal to generate a correlated signal.

22. The system of claim 21, further comprising an output system to transmit the correlated signal.

23. The system of claim 22, further comprising a processor to processes the correlated signal.

24. The system of claim 23, wherein the processor comprises a display to display the correlated signal.

25. The system of claim 21, wherein the correlator comprises a pulse compression filter.

26. The system of claim 25, wherein the pulse compression filter comprises a mismatch filter design.

27. The system of claim 21, wherein the signal modifier comprises the correlator.

28. The system of claim 21, wherein the modified second signal comprises one of at least an amplitude and a phase modification.

29. The system of claim 21, wherein the second signal comprises a reference waveform.

30. The system of claim 29, wherein:
the first signal comprises a first waveform; and
the modified reference waveform is substantially identical to the first waveform.

31. The system of claim 29, wherein:
the first signal comprises a first waveform; and
the modified reference waveform is substantially a complex conjugate of the first waveform.

32. The system of claim 21, wherein the system comprises a radar system.

33. The system of claim 21, wherein the system comprises a missile seeking system.

34. The system of claim 21, wherein at least one of the first signal and the second signal comprises a coded waveform.

35. The system of claim 34, wherein the coded waveform comprises at least one of a poly-phase code and a binary code.

36. The system of claim 21, wherein the system minimizes side lobes and increases signal to noise ratio of the correlated signal.

37. The system of claim 21, wherein the identifiable hardware errors are determined by a calibration system.

38. The system of claim 37, wherein the calibration system conducts one of at least an on-line calibration and an off-line calibration.

39. The system of claim 21, wherein the system comprises a pulsed Doppler radar system.

40. A pulsed Doppler radar system comprising improved signal performance comprising:
a first signal generator to generate a first signal;
a transmitter to transmit the first signal;
an antenna to receive the first signal;
a reference signal generator to generate a reference signal; and
a pulse compression filter, wherein the pulse compression filter:
modifies the reference signal based upon identifiable hardware errors from at least one of a hardware from the first signal generator and a hardware from the antenna; and
correlates the modified reference signal and the received first signal to generate a correlated signal.

41. The pulsed Doppler radar system of claim 40, further comprising an output system to transmit the correlated signal.

42. The pulsed Doppler radar system of claim 41, further comprising a display to display the transmitted correlated signal.

43. The pulsed Doppler radar system of claim 40, wherein the pulse compression filter comprises a mismatch filter design.

44. The pulsed Doppler radar system of claim 40, wherein the generated first signal and the generated reference signal are substantially identical waveforms.

45. The pulsed Doppler radar system of claim 40, wherein the generated reference signal comprises substantially a complex conjugate waveform of the generated first signal.

46. The pulsed Doppler radar system of claim 40, wherein the pulsed Doppler radar system comprises a component of a missile seeking system.

47. The pulsed Doppler radar system of claim 40, wherein at least one of the first signal and the reference signal comprises a coded waveform.

48. The pulsed Doppler radar system of claim 47, wherein the coded waveform comprises any form of a phase coded waveform.

49. The pulsed Doppler radar system of claim 40, wherein the identifiable hardware errors are identified by calibration of the pulsed Doppler radar system.

50. The pulsed Doppler radar system of claim 49, wherein the calibration is conducted by one of at least an on-line calibration and an off-line calibration.

* * * * *